United States Patent [19]

Osder

[11] 4,171,115
[45] Oct. 16, 1979

[54] STABILITY AUGMENTATION SYSTEM FOR RELAXED STATIC STABILITY AIRCRAFT

[75] Inventor: Stephen S. Osder, Scottsdale, Ariz.

[73] Assignee: Sperry Rand Corporation, New York, N.Y.

[21] Appl. No.: 859,410

[22] Filed: Dec. 12, 1977

[51] Int. Cl.² ............................................. G05D 1/08
[52] U.S. Cl. .................................. 244/181; 244/194; 318/565; 318/584; 364/435
[58] Field of Search ............... 244/177, 181, 185, 194, 244/195, 196, 197; 318/564, 565, 580, 584–586; 73/178 R; 364/434, 435, 453, 554; 340/27 AT, 27 NA

[56] References Cited

U.S. PATENT DOCUMENTS

| | | | |
|---|---|---|---|
| 2,487,793 | 11/1949 | Esval | 318/565 |
| 2,808,999 | 10/1957 | Chenery | 244/185 |
| 3,007,656 | 11/1961 | Miller | 244/196 |
| 3,100,861 | 8/1963 | Osder | 244/194 |
| 3,752,420 | 8/1973 | Osder | 244/196 |

*Primary Examiner*—Reinhard J. Eisenzopf
*Attorney, Agent, or Firm*—Howard P. Terry; Albert B. Cooper

[57] ABSTRACT

The outputs of a pair of linear accelerometers are utilized to provide measures of craft vertical acceleration and body axis pitch angular acceleration. The pitch angular acceleration signal is integrated to provide a measure of body axis pitch rate. The pitch rate signal is in turn integrated to provide a measure of body axis pitch attitude. An earth referenced pitch attitude sensor provides a measure of earth referenced pitch attitude and through a rate taker a measure of earth referenced pitch rate. The earth referenced sensor is utilized to calibrate out errors and effectively align the linear accelerometers so that in the event of a loss of the earth referenced sensor, the calibrated accelerometers have adequate accuracy to compute pitch rate and pitch attitude within the long period bandwidth needed to provide the stability augmentation function for a relaxed static stability aircraft. The earth referenced and body axis pitch rate signals are blended and the earth referenced and body axis pitch attitude signals are blended whereby steady state differences therebetween are washed out through a long time constant washout, the earth referenced signals dominating in the steady state. The linear vertical acceleration and angular acceleration signals and the blended pitch rate and pitch attitude signals are combined in a control law to drive the craft elevator servo. Failure of the earth referenced attitude sensor results in a graceful degradation of the control law to washed out body axis attitude and attitude rate control.

25 Claims, 2 Drawing Figures

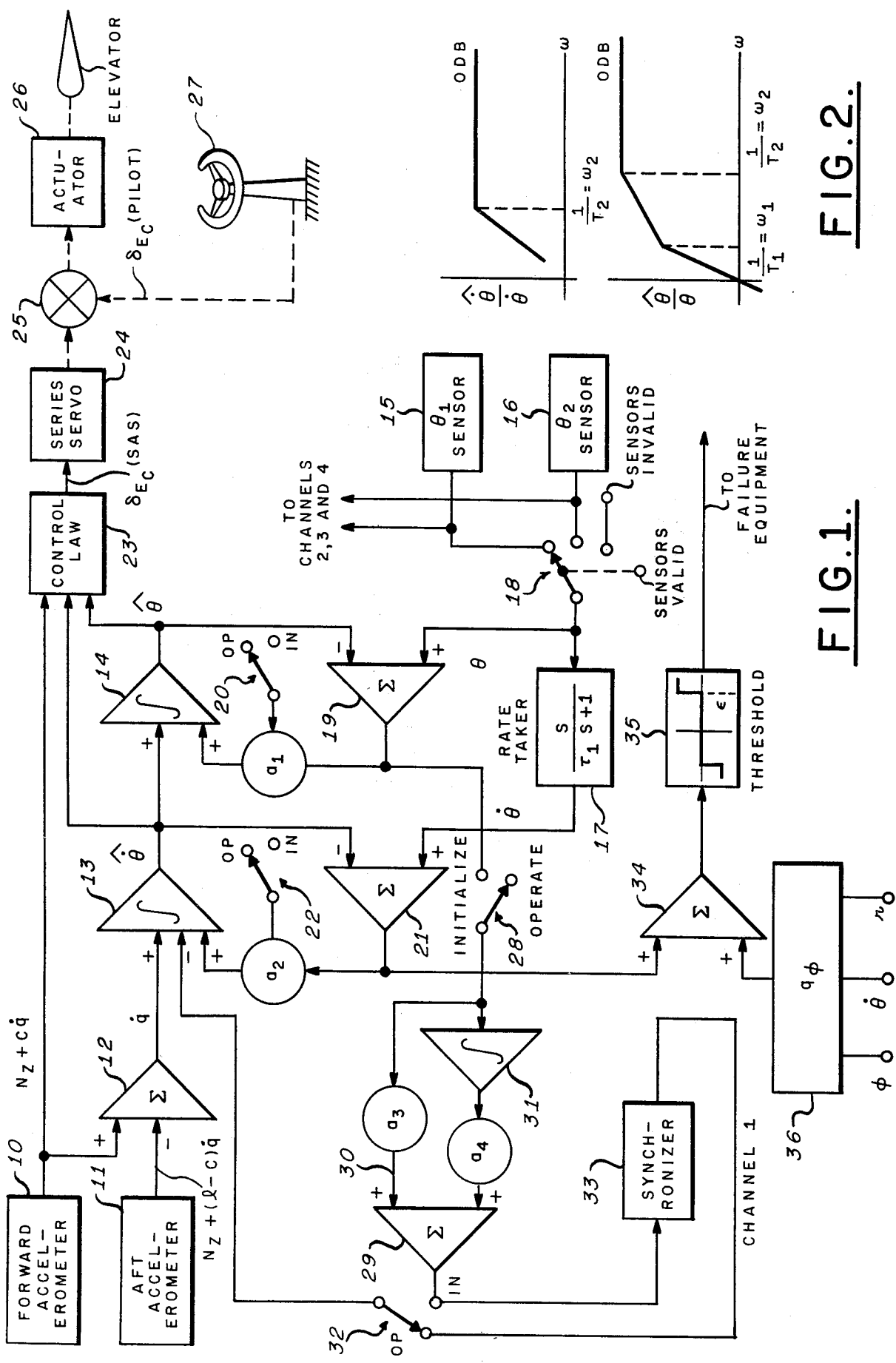

STABILITY AUGMENTATION SYSTEM FOR RELAXED STATIC STABILITY AIRCRAFT

BACKGROUND OF THE INVENTION

1. Field of the Invention

The invention relates to stability augmentation systems particularly with respect to requirements for relaxed static stability aircraft.

2. Description of the Prior Art

As is known, conventional modern day aircraft are structurally designed to provide inherent aerodynamic longitudinal static stability so as to impart safe and desirable flight and handling characteristic to the aircraft. Typically this may be achieved by balancing the pitching moment of the center of lift about the center of gravity of the aircraft with an equal and opposite pitching moment from the horizontal stabilizer maintained in a deflected attitude with respect to its streamlined position. When, for example, a gust disturbance deflects the aircraft in pitch, an aerodynamically statically stable craft tends to return to its original attitude. When the pilot maneuvers such an aircraft in pitch by utilizing the control column, the aircraft responds to the command, holds a new angle of attack (which is approximately equal to an attitude change for most maneuvers) as long as the control column is deflected, and returns to its original angle of attack when the control column is released. The aerodynamic restoring moments tend to impart a restoring spring characteristic with respect to the craft pitch attitude.

It is known in the art to enhance the oscillatory dynamic stability of the craft by utilizing stability augmentation systems. Such systems generally utilize pitch rate in the control laws. The sensors commonly utilized to measure this parameter are angular accelerometers or rate gyros. Present day angular accelerometers suitable for control purposes tend to be expensive and generally the signals provided thereby are only suitable for oscillatory high frequency damping. Present day rate gyroscopes as well as tending to be expensive, have relatively low long term reliability because of the rapidly rotating members.

Such stability augmentation systems utilized for oscillatory damping purposes have heretofore not been flight critical components since even if total failure of the system should occur the aircraft would retain its aerodynamic longitudinal static stability which imparted safe flight and adequate pilot handling characteristics to the aircraft so that the flight could be safely completed.

It is appreciated that in order to obtain the relatively large balancing moments about the craft pitch axis to provide longitudinal static stability, considerable drag is introduced that adversely affects the fuel economy of the aircraft. It is currently being considered to relax the aerodynamic longitudinal static stability of the aircraft so as to increase fuel economy. This would be accomplished by maintaining the horizontal stabilizer of the aircraft in a relatively aerodynamically streamlined position and perhaps by reducing the surface area thereof. It would be necessary then to design the aircraft with the center of lift close to the center of gravity. Since the craft would no longer have the stiff spring aerodynamic restoring moments that heretofore imparted static stability to the craft, the marginally stable or statically unstable craft would no longer have safe flight characteristics and desirable pilot handling characteristics. In such an aircraft a gust disturbance causing a pitch deflection may result in the craft continuing to diverge in pitch attitude. The pilot manual controls of such a craft may be extremely sensitive whereby it the pilot should impart a pitch control motion to the column, the craft may respond with an excessive pitch maneuver leading to a tendency toward pilot induced oscillations.

In order to render safe the flight characteristics of a relaxed longitudinal static stability aircraft and to provide desirable pilot handling characteristics, it is necessary to replace the aerodynamic static stability with a stability augmentation system. In the instance of a relaxed static stability aircraft, however, the stability augmentation system becomes a flight critical component of the aircraft whereby total failure thereof could result in loss of the craft. In order to impart the necessary reliability to such systems, generally triply or quadruply redundant channels are required. In order to provide the necessary static stability for the relaxed static stability aircraft, a control law that includes a pitch attitude term as well as terms measuring pitch rate, pitch acceleration and vertical acceleration are required. Since attitude sensors such as vertical gyroscopes or inertial platforms tend to be expensive, heavy and subject to failure and rate gyroscopes and angular accelerometers have the disadvantages discussed above, quadruply redundant sensor instrumentation for such a system would tend to be prohibitively expensive, bulky and heavy while tending to be unreliable because of the rapidly rotating members utilized in such gyroscopic instrumentation.

Linear accelerometers on the other hand are relatively inexpensive and highly reliable since such instruments do not include rapidly rotating components. As well as measuring linear vertical acceleration, a pair of linear accelerometers mounted respectively forward and aft of the center of gravity or merely separated by a reasonable distance have been utilized to provide a measure of pitch acceleration and pitch rate. Such use of linear accelerometers is taught in Applicant's assignee's U.S. Pat. Nos. 3,007,656, entitled "Aircraft Automatic Pilot" by H. Miller et al, issued Nov. 7, 1961; 2,808,999 entitled "Automatic Flight Control Apparatus" by P. J. Chenery, issued Oct. 8, 1957; and 2,487,793 entitled "Object Controlling Electric Motor System", by O. E. Esval et al, issued Nov. 15, 1949. In such prior art instrumentation, e.g., U.S. Pat. No. 3,007,656, the outputs of the linear accelerometers are combined to provide pitch angular acceleration, which combined signal is passed through a lag network to provide a signal that simulates pitch angular rate with a washout.

In the prior art linear accelerometers have only been utilized for dynamic high frequency stabilization. This was the situation because the linear accelerometers separately, and combined as described in U.S. Pat. No. 3,007,656, are subject to gradient errors and bias errors which are necessarily washed out in using these sensors. Thus prior to the present invention linear accelerometers with their steady state errors could not be utilized to provide an accurate and reliable measure of attitude which measure is required for static stabilization in a stability augmentation system for relaxed static stability aircraft.

It is the desideratum of the present invention to provide a suitable stability augmentation system for relaxed static stability aircraft utilizing linear accelerometers as the primary sensing instruments.

SUMMARY OF THE INVENTION

This desideratum is achieved by a stability augmentation system comprising a pair of linear accelerometers whose outputs are combined to provide a measure of body axis pitch angular acceleration. The angular acceleration signal is integrated to provide a measure of body axis pitch rate and again integrated to provide a measure of body axis pitch attitude. Outputs, from earth referenced sensor means provide measures of earth referenced pitch rate and earth referenced pitch attitude. The body axis and earth referenced signals respectively are blended so that the differences therebetween are washed out with the earth referenced signals dominating in the steady state. Vertical acceleration and angular acceleration signals from the linear accelerometers, the blended pitch rate signal and the blended pitch attitude signal are combined into a control law for driving the elevator servo. The apparatus includes means for aligning the accelerometer generated signals with the earth referenced signals. This alignment characteristic which is provided by the blending filter serves to provide a calibration correction for the bias, alignment and gradient errors which have hitherto precluded the use of such accelerometer sensors in the computation of attitude. The apparatus is configured so that should the earth referenced sensor means fail the control law gracefully degrades to a control law comprising washed out body axis attitude and attitude rate terms. The computed washed out attitude is of high quality thereby allowing a long washout time constant. This high quality is made possible by the automatic alignment and calibration provided by the blending filter. The apparatus additionally provides an output for monitoring the last remaining vertical reference.

BRIEF DESCRIPTION OF THE DRAWINGS

FIG. 1 is a schematic block diagram illustrating the stability augmentation system of the present invention;

FIG. 2 comprises graphs illustrating the graceful degradation of the control law.

DESCRIPTION OF THE PREFERRED EMBODIMENT

Referring to FIG. 1, a schmatic block diagram of the stability augmentation system of the present invention is illustrated. Fore and aft linear accelerometers 10 and 11 respectively are mounted preferably along the longitudinal axis of the craft to provide measures of the vertical acceleration $N_Z$. The accelerometers 10 and 11 are mounted a distance l apart, the forward accelerometer 10 being mounted a distance c forward of the center of gravity of the craft with the aft accelerometer being mounted aft of the center of gravity. It will be appreciated that it is not necessary that accelerometers 10 and 11 be mounted forward and aft respectively of the center of gravity of the craft. It is necessary merely that the accelerometers be separated by a reasonable distance. Each accelerometer additionally provides a measure of the body axis angular acceleration $\dot{q}$ of the craft. Ideally the output of the forward accelerometer is:

FORE ACC $= N_z + c\dot{q}$ and the ideal output from the aft accelerometer is:

AFT ACC $= N_z + (l-c)\dot{q}$

The outputs from the accelerometers 10 and 11 are applied to a summing stage 12 wherein the difference therebetween is obtained yielding the body axis pitch acceleration $\dot{q}$.

As is known, linear accelerometers are subject to errors including bias errors and gradient errors which normally manifest themselves as steady state errors. For example, a difference in sensitivity gradient between the accelerometers 10 and 11 would result in an erroneous output from the summing stage 12 in response to the gravitational constant of 1g. Additionally, bias or offset errors arise because of misalignment of component parts within the instruments themselves and because of misalignment of the instruments in the aircraft. Errors of these types may also be caused by the electronic circuitry associated with the instruments. Because of these errors, linear accelerometers have heretofore been limited to use as sensors for dynamic high frequency damping and precluded from use as aircraft attitude sensors.

Thus it is appreciated that the output of the summing stage 12 contains the desirable signal $\dot{q}$ as well as error components which are removed by the present invention in a manner to be explained.

The output of the summing stage 12 is passed through an integrator 13 to provide a pitch rate estimate signal $\hat{\dot{\theta}}$. The output of the integrator 13 is applied as an input to second integrator 14 that integrates the pitch rate estimate $\hat{\dot{\theta}}$ to provide a pitch attitude estimate $\hat{\theta}$.

The components so far described are part of one channel of a quadruply redundant stability augmentation system. The system also includes dual redundant vertical references 15 and 16. Each of the references 15 and 16 may comprise a vertical gyroscope, a stable platform, an inertial navigation system or the like. The outputs of the sensors 15 and 16 provide vertical reference signals to the remaining channels 2, 3 and 4 of the system. Each of the sensors 15 and 16 provides an earth referenced Euler angle measure of craft pitch attitude $\theta$. The vertically referenced pitch attitude signal $\theta$ is differentiated in a rate taker 17 to provide an earth referenced Euler angle pitch rate signal $\dot{\theta}$. In the absence of failure of the vertical references 15 and 16, the output of the sensor 15 is utilized to provide the vertical reference signal to the four channels of the stability augmentation system. If the sensor 15 should fail, conventional circuitry (not shown) actuates a switch 18 to engage the remaining sensor 16. If both sensors 15 and 16 should fail the switch 18 is activated to the "sensors invalid" position to preferably ground the vertical reference input to the system.

The pitch attitude estimate signal $\hat{\theta}$ from the integrator 14 and the vertically referenced Euler angle pitch attitude signal $\theta$ from the vertically referenced attitude sensor 15 are applied as inputs to a summing stage 19 which provides the difference therebetween as an input to the integrator 14 with a variable gain $a_1$. The gain $a_1$ is controlled by a switch 20 to provide a relatively low value when the switch 20 is in the operate position (OP) and a relatively high value when the switch 20 is in the initialize position (IN). Typically in the operate position $a_1 = 0.25$ providing a time constant of 4.0 seconds and in the initalize position $a_1$ is approximately 2 thereby providing a time constant of about 0.5 seconds. It is appreciated that the encircled gain legend $a_1$ is schematically representative of the gain through the loop comprising the integrator 14 and the summing stage 19 where the gain is typically controlled by the summing stage 19 or within the integrator 14.

The pitch rate estimate signal $\hat{\dot{\theta}}$ from the integrator 13 and the vertically referenced Euler angle pitch rate signal $\dot{\theta}$ from the rate taker 17 are applied as inputs to a summing stage 21 which provides the difference therebetween as an input to the integrator 13 with a variable gain $a_2$. The gain $a_2$ is controlled by a switch 22 to provide a relatively low gain when the switch 22 is in the operate position and a relatively high gain when the switch 22 is in the initialize position. Typically the gains utilized are the same as those discussed with respect to the gain $a_1$.

The outputs of the forward accelerometer 10, the integrator 13 and the integrator 14 are applied as inputs to control law block 23. The output of the control law block 23 provides a stability augmentation system (SAS) elevator deflection signal as follows:

$$\delta_{E_c}(SAS) = k_1(N_z + c\dot{q}) + k_2\hat{\dot{\theta}} + k_3(\hat{\theta} - \theta_{SYNC})$$

The gain constants $k_1$, $k_2$ and $k_3$ are established in a conventional manner in the control law block 23. The quantity $\theta_{SYNC}$, which is the value of $\theta$ when the system is initialized, is utilized to null the output of the vertical sensors 15 and 16 during initalization, preferably when the aircraft is on the ground prior to a flight and is so utilized throughout the flight. The quantity $(\theta - \theta_{SYNC})$ may be provided from a conventional attitude synchronizer which provides the measured variations in attitude with respect to $\theta_{SYNC}$. It will be appreciated that the quantity $\theta - \theta_{SYNC}$ is provided to the rake taker 17 and the summing stage 19 but is for convenience denoted as $\theta$ and illustrated as the $\theta$ sensors 15 and 16.

The elevator output command from the SAS is applied to a series servo 24, the output of which is in turn applied through a mechanical summer 25 to the elevator main power actuator 26. A pitch command signal from the pilot's control column 27 is combined with the output of series servo 24 in the mechanical summer 25.

As discussed above, the signal from the summing stage 12 contains error components from the accelerometers 10 and 11 which error components would tend to build up in the integrators 13 and 14 causing erroneous computations of $\hat{\dot{\theta}}$ and $\hat{\theta}$ and hence erroneous deflections of the elevator. During the initialization of the system these errors are nulled at the input to the integrator 13 through a second and third order loop closed from the output of the summing amplifier 19 to the input of the integrator 13. The loop error signal for the initialization process provided by the summing stage 19 is applied through a switch 28 and a summing stage 29 via a direct path 30 and an integral path 31 to the input of the integrator 13 via a switch 32. The direct path 30 and the integral path 31 have respective gains $a_3$ and $a_4$ associated therewith as schematically indicated by the legends. The gains $a_3$ and $a_4$ are selected for loop stability and may be sufficiently high to provide convergence to the required balance signal at the input of the integrator 13 in approximately ten seconds. The final value of the balance signal provided from the integrator 31 is clamped in a synchronizer 33 for use throughout the flight when the system is in the operate mode.

During initialization of the system, which normally occurs prior to a flight when the aircraft is on the ground, the output of the engaged attitude sensor 15 is nulled by utilizing the $\theta_{SYNC}$ signal as described above. the switches 20, 22, 28 and 32 are positioned to their initialize contacts which sets the gains $a_1$ and $a_2$ to their high gain values, connects the output of the summing amplifier 19 to the direct and integral paths 30 and 31 and connects the output of the summing stage 29 to the input of the integrator 13. In this configuration the integrator 13 is forced to provide the vertically referenced Euler angle pitch rate $\dot{\theta}$ as its output and the integrator 14 is forced to provide the vertically referenced Euler angle pitch attitude 74 as its output. Thus during initialization of the system the gains $a_1$ and $a_2$ are increased to provide 0.5 second initializing time constants to provide a rapid convergence of $\hat{\dot{\theta}}$ to the output of the $\dot{\theta}$ rate taker 17 and $\hat{\theta}$ to $\theta$ from the selected $\theta$ sensor 15 or 16. Additionally, by reason of the second and third order loop closed from the output of the summing stage 19 to the input of the integrator 13 the error components provided from the accelerometers 10 and 11 are balanced by the output of the summing stage 29. This is appreciated from the fact that the accelerometer errors will cause a discrepancy between the pitch attitude estimate $\hat{\theta}$ from the integrator 14 and the true pitch attitude $\theta$ from the attitude sensor 15 resulting in a non-zero error signal from the summing stage 19. This error signal is applied through the balancing loop 29, 30, 31 until the output of the summing stage 19 is driven to zero. The synchronizer 33 memorizes the output of the summing stage 29 that is required to balance the errors. The gains $a_3$ and $a_4$ may be selected for loop stability and may be made high enough to yield convergence to the required balance signal in approximately ten seconds.

By the above instrumentation and procedure the pitch rate and pitch attitude signals are aligned with the corresponding reference signals provided by the earth referenced attitude sensor 15.

As an alternative arrangement during inialization the initializing values of $\theta$ and $\dot{\theta}$ from the attitude sensor 15 may be directly inserted into the respective integrators 14 and 13 eliminating the requirement of changing the gains $a_1$ and $a_2$.

After initialization switches 20, 22, 28 and 32 are positioned to their operate contacts which reduces the gains $a_1$ and $a_2$ to approximately 0.1 to 0.25, disconnects the output of the summing stage 19 from the balancing loop and connects the output of the synchronizer 33 to the input of the integrator 13. The switches 20, 22, 28 and 32 are maintained in their operate positions throughout the flight, thereby maintaining the error balancing signal from the synchronizer 33 at the input to the integrator 13. When the system is switched to the operate mode, the $\theta_{SYNC}$ signal is clamped thereby providing attitude variations throughout the flight with respect to this clamped value.

Thus during the operate mode, the $\hat{\dot{\theta}}$ estimate which is the output of the integrator 13 is the integral of $\dot{q}$, body axis angular acceleration in the short term and converges to the vertically referenced Euler angle rate $\dot{\theta}$ in the steady state. The convergence of $\hat{\dot{\theta}}$ is controlled by the gain $a_2$, the effective time constant of the convergence being $(1/a_2)$. As discussed above, typically $a_2 = 0.1$ to 0.25 providing an effective 10.0 to 4.0 second washout of any disagreement between body axis pitch rate q and the Euler angle pitch rate $\dot{\theta}$ and $\dot{\theta}$ dominating in the steady state. Gain values for $a_2$ may also typically be in the range 0.1 to 0.25 providing time constants as great as 10 seconds.

The pitch rate estimate $\hat{\dot{\theta}}$ from the integrator 13 is again integrated by the integrator 14 to produce the pitch estimate $\hat{\theta}$ which includes a slight amount of integrated body axis q in the short term. The pitch estimate $\hat{\theta}$ converges to the vertically referenced pitch attitude $\theta$ with the time constant $(1/a_1)$ which typically may have the same values as provided by the gain $a_2$.

As discussed above, the described stability augmentation system provides artificial longitudinal static stability for relaxed static stability aircraft. When, for example, the craft experiences a pitch attitude disturbance, the control law pitch attitude term provided by the integrator 14 prevents the aircraft from statically diverging in pitch attitude as would be the situation with aircraft devoid of longitudinal static stability. The control law provides a stabilizing signal that tends to restore the aircraft to its original pitch attitude after a disturbance. When the pilot maneuvers the craft through the control column 27 the craft continues to change attitude until the signal $\delta_{Ec}$ (SAS) balances the $\delta_{Ec}$ (PILOT) provided from the control column. When the pilot releases the control column 27 the craft returns to its original pitch attitude. Thus it is appreciated that the stability augmentation system of the present invention artificially provides the necessary longitudinal static stability to maintain safe flying and desirable handling characteristics.

The above-described SAS configuration provides a blend of body axis and vertically referenced pitch attitude rate and a blend of body axis and vertically referenced pitch attitude. The blending configuration not only permits an alignment of the outputs of the accelerometers 10 and 11 with the accurate vertical reference 15, the cancelling of steady state errors of the accelerometers and the use of the accurate vertical references as long as they remain valid, but additionally provides an inherently simple reversion and graceful degradation to a backup configuration that permits control to continue with total loss of the vertical references 15 and 16. When the vertical references fail, the switch 18 is positioned to the "sensors invalid" contact which effectively provides ground potential to the "+" inputs to the summing stages 19 and 21. In this configuration the integrator 13 with the associated summing stage 21 and the integrator 14 with the associated summing stage 19 revert to washout circuits with respective time constants of $(1/a_2)$ and $(1/a_1)$.

When the vertical references 15 and 16 fail, the control law given above degrades to $$\delta_{Ec}(SAS) = k_1(N_z + cq) + \frac{k_2q(1/a_2)S}{(1/a_2)S + 1} + \frac{k_3q(1/a_1)(1/a_2)S}{[(1/a_1)S + 1][1(a_2)S + 1]}$$

Thus the pitch rate is washed out with a time constant $(1/a_2)$ and the pitch attitude is washed out with time constants of $(1/a_1)$ and $(1/a_2)$. Since the time constants may be as great as ten seconds, a long washout is effected in the reversionary mode and a short term or dynamic attitude reference is provided by the integrator 14. The static stability stiffening effect of the $k_3$ term in the reversion equation may be augmented by raising the $k_1$ gain when in the reversionary mode.

Thus when the system has reverted to the reversionary mode because of total failure of the vertical references, the washed out pitch rate and washed out pitch attitude provide adequate stabilization with respect to disturbances within the frequency bandwidth of the washout. Since the washout may be as great as ten seconds, the stability augmentation system is effective against normally occurring short term pitch disturbances. Because of the long time constant washouts, pitch control motions required by the pilot via the control column 27 may be gradual so that in the reversionary mode adequate aircraft handling characteristics are retained.

It is appreciated that the long time constant washouts that are utilized in the reversionary modes are made possible by the initial alignment of the accelerometer outputs with the valid vertical reference providing the balancing signal from the synchronizer 33. The balancing signal nulls out most of the steady state errors normally provided by accelerometers of the type utilized. If these errors were not initially balanced out, short time constant washouts would be required to prevent error build up in the integrators 13 and 14, which would otherwise cause erroneous hardover signals. Short time constant washouts would not provide adequate stability and handling characteristics for a relaxed static stability aircraft. The long time constant washouts which provide the adequate stability and acceptable handling characteristics also remove any long term error build up from the accelerometers and associated electronic circuitry.

It is appreciated that when the SAS reverts to the reversionary mode, although the handling characteristics of the aircraft are adequate, the characteristics are not as good as they were prior to failure. For example, in order to maneuver the aircraft in pitch the pilot applies control pressure to the control column 27 whereupon the craft responds by changing pitch attitude until the output of the control law circuits 23 balances the pilot command into the summing junction 25. The control law signal, however, in the reversionary mode washes out in approximately ten seconds and, therefore, the pilot must gradually relieve the control pressure on the control column 27 in order to maintain the desired craft attitude. Additionally, the long time constant washouts provide the pilot with adequate time to utilize the craft trim systems. Thus, it is appreciated that even in the reversionary mode of the system only gradual control motions are required by the pilot and the craft retains adequate stability and handling capabilities to safely complete the flight.

Specifically, when the operate mode is engaged, $a_1$ and $a_2$ are decreased to values between 0.1 and 0.2 seconds. If the rate taker time constant is sufficiently small ($\tau_1$ less than about 0.1 seconds), then the $\hat{\theta}$ and $\hat{\dot{\theta}}$ estimate signals will be equal to:

$$\hat{\dot{\theta}} = q\left(\frac{s}{s + a_2}\right) + \dot{\theta}\left(\frac{a_2}{s + a_2}\right)$$

or $$\hat{\dot{\theta}} = q\left(\frac{T_2s}{T_2s + 1}\right) + \frac{\dot{\theta}}{T_2s + 1}$$

where $T_2 = \left(\frac{1}{a_2}\right)$ and $\hat{\theta} = \left[\frac{T_2q}{T_2S + 1} + \frac{\theta}{T_2s + 1}\right]\frac{T_1s}{T_1s + 1} + \frac{\theta}{T_1s + 1}$ where $T_1 = \left(\frac{1}{a_1}\right)$ It is appreciated that when $q=\dot{\theta}$ (as in non-banked flight)

$\hat{\dot{\theta}} = \dot{\theta}$, and $\hat{\theta} = \theta$

If, in a long duration flight, both attitude references fail, then the system reverts to a degraded mode in which $$\hat{\dot{\theta}} = q \frac{T_2 s}{T_2 s + 1}$$

and $\hat{\theta} = q \frac{T_1 T_2 s}{(T_1 s + 1)(T_2 s + 1)}$

In the zero bank angle case where $\dot{\theta} = q$.

$$\hat{\dot{\theta}} = \dot{\theta} \frac{T_2 s}{T_2 s + 1},$$

$$\hat{\theta} = \theta \frac{T_1 T_2 s^2}{(T_1 s + 1)(T_2 s + 1)}$$

Accordingly, FIG. 2 illustrates the graceful degradation of the control law from that when the attitude references are valid to the control law in the reversionary mode. If the frequency $(1/T_1)$ and $(1/T_2)$ are sufficiently low, estimates of $\theta$ and $\dot{\theta}$ at sufficiently low frequencies are available to provide adequate capability in stabilizing the relaxed static stability aircraft. Large time constants (in the vicinity of ten seconds) may be utilized because of the alignment of the SAS with the attitude reference thereby obtaining information to balance the accelerometer errors.

The apparatus of FIG. 1 additionally has the capability of monitoring a sole surviving vertical reference by utilizing the signal provided from the summing amplifier 21. When only one of the vertical references survives, voting of the $\theta$ signals is no longer feasible but comparison of $\dot{\theta}$ from the rate taker 17 and q from the integrator 13 with appropriate adjustment made for bank angle $\phi$ in the failure threshold provides the monitoring function.

The output of the summing stage 21 is applied to a bank angle compensating summing stage 34 whose output is in turn applied to a conventional threshold circuit 35. The second input to the summing stage 34 is provided from bank angle compensating circuits 36. The output of the threshold circuit 35 is applied to failure equipment which performs the necessary conventional functions of channel shutdown and annunciation when failure is detected.

It will be appreciated that the output of the summing stage 21 is utilized to not only monitor the vertical references but also the accelerometer sensors and associated signal conditioning circuitry. This monitoring is predicated on the fact that if the accelerometer signals and attitude reference signals are proper, $\dot{\theta}$ should be equal to $\hat{\dot{\theta}}$, the rate taker output, except for the differences which result because $\dot{\theta}$ contains body axis information and $\hat{\dot{\theta}}$ is an Euler angle rate obtained from an earth referenced coordinate system. The differences between $\dot{\theta}$ and $\hat{\dot{\theta}}$ occur during bank angle maneuvers. The body axis pitch rate is obtained by integrating $\dot{q}$ and the accelerometer difference signal from the summing stage 12 is:

$$q = \frac{\dot{\theta}}{\cos \phi} + r \tan \phi$$

where r=body axis yaw rate and $\phi$=bank angle.

In a coordinated turn, this can be expressed approximately as:

$$q = \frac{q}{V} \tan \phi \sin \phi$$

where V=airspeed. To account for the difference due to bank angle between q and $\dot{\theta}$ in the monitoring apparatus, the difference which appears in q may be defined as $q_\phi$.

Thus $q = q_\phi + q_1 \approx q_\phi + \dot{\theta}$ $$q_\phi = \dot{\theta} \frac{(1 - \cos \phi)}{\cos \phi} + r \tan \phi$$

$\dot{\theta} + q_\phi = q$, or $\dot{\theta} + q_{100} - q = 0$

The output from the summing stage 21 is $(\dot{\theta} - q)$. Therefore the monitor may be set as follows:

$$q_\phi = \left\{ \left( \frac{1 - \cos \phi}{\cos \phi} \right) \dot{\theta} + r \tan \phi \right\} ((G_1))$$

where $(G_1) = \frac{T_2 s}{T_2 s + 1}$

If yaw rate r is not available, then:

$$q_\phi = \left( \frac{q}{V} \right) \tan \phi \sin \phi + \left( \frac{1 - \cos \phi}{\cos \phi} \right) \dot{\theta}$$

The quantity $\phi$ may be obtained from the attitude reference and V may be obtained from an auxiliary gain control sensor used in the augmentation system where Mach can approximate V.

If V data is lost, then a nominal value of V may be utilized and the threshold $\epsilon$ increased to account for the inaccuracy of this approximation.

Therefore, it is appreciated that when the aircraft executes bank angle maneuvers the body axis signal in the output from the integrator 13 due to the bank angle is duplicated in the circuitry 36 and cancelled at the summing stage 34 so that only discrepancies between the body axis and earth referenced sensors due to failure from either source will exceed the level of the threshold circuit 35 to trigger a failure procedure.

It will be appreciated from the foregoing that the components 34, 35 and 36 comprise monitoring means for monitoring the performance of the vertical references 15 and 16 as well as the performance of the accelerometers 10 and 11. As described above, when the sensors are functioning properly, the output from the summing stage 21 is less than the threshold set in the threshold device 35. As the aircraft maneuvers, the pitch rate estimate from the integrator 13 remains equal to the pitch rate from the rate taker 17, thus providing zero output from the summing stage 21. If either the accelerometers 10 and 11 or the vertical references 15 or 16 should fail, the inputs to the summing stage 21 will no longer be equal and opposite and the output thereof will exceed the threshold of the threshold device 35 thereby indicating failure.

As discussed above, during banked maneuvers it is expected that the output from the integrator 13 will depart from the output from the rate taker 17 since the rate taker output is vertically referenced and the integrator output is referenced to the aircraft body axes. As discussed, this departure between the two signals is compensated by the adjusting circuit 36 at the summing stage 34 whereby during proper operation, even during banked maneuvers, the total signal will not exceed the threshold. It is thus appreciated that the components 34 and 36 comprise a threshold adjusting circuit for effectively adjusting the threshold in accordance with the aircraft bank angle. As the bank angle increases, the effective threshold is effectively increased so that false failures are not detected.

It is thus appreciated from the foregoing description of the preferred embodiment that the invention generates an estimate of $\dot{\theta}$ and $\theta$ that is a desirable blend of body axis and earth referenced signals for a static stability augmentation control law. The invention utilizes inexpensive and reliable linear accelerometers in quad redundant fashion to provide the necessary safety of flight reliability. Dual redundant attitude sensors, which tend to be expensive and less reliable than the linear accelerometers, are utilized to align the rate and attitude measurements from the accelerometers. The stability augmentation system is configured to provide a "get home" reversionary capability providing dynamic $\dot{\theta}$ and $\theta$ estimates when the $\theta$ sensors have failed. The stability augmentation system additionally provides the capability of monitoring a sole remaining attitude sensor. The system provides pitch rate without the requirement of expensive, and unreliable rate gyroscopes. Thus a true inertial or earth referenced attitude term $\theta$ is utilized to align the attitude measurement provided by the accelerometers but the system is not dependent upon the inertial measurement for survival. As long as the inertial sensors remain valid the attitude measurement provided thereby continues to align the system and remove residual errors from the accelerometers. When, however, the attitude sensors fail, the system may continue operating at a fairly high performance level.

Although the preferred embodiment of the invention was described in terms of the earth referenced or inertial attitude sensors 15 and 16 which may specifically be implemented by vertical gyroscopes, stable platforms, inertial reference systems and the like, it will be appreciated that any sensor providing true measures of pitch attitude and pitch rate which are not subject to the errors discussed above with respect to the linear accelerometers 10 and 11, may be utilized for aligning the computations. Although the above-described stability augmentation system is particularly suitable for providing artificial static stability in a relaxed static stability aircraft, the SAS may also be utilized to augment the stability of conventional aircraft for the advantages that it provides such as very tight craft stabilization.

It will be appreciated that the paired linear accelerometers 10 and 11 could also provide signals for elastic mode stabilization or load alleviation. If elastic mode signals are not desired, they would tend to be attenuated by the limited bandwidth of the illustrated system.

It will be appreciated that the invention may also be embodied in a programmed digital computer responsive to the accelerometers 10 and 11 and the attitude sensors 15 and 16 and providing the output $\delta_{Ec}$ (SAS) as illustrated. All of the components 12–14, 17–23 and 28–36 may be implemented by the programmed computer. Additionally, the function of $\theta_{SYNC}$ described above may also be software implemented.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A stability augmentation system for aircraft having control surface means for controlling said aircraft about an axis thereof comprising first and second linear accelerometer means mounted in said aircraft for providing first and second linear acceleration signals, combining means for combining said first and second linear acceleration signals for providing a signal in accordance with the angular acceleration of said aircraft about said axis, first integrator means for integrating said angular acceleration signal to provide a first estimate signal in accordance with the angular rate of said aircraft about said axis, second integrator means for integrating said first estimate signal to provide a second estimate signal in accordance with the angular displacement of said aircraft about said axis, reference sensor means for providing reference signals in accordance with angular rate and angular displacement, respectively, of said aircraft with respect to said axis, first washout circuit means, including said first integrator means, responsive to said first estimate signal and said angular rate reference signal for washing out steady state differences therebetween, second washout circuit means, including said second integrator means, responsive to said second estimate signal and said angular displacement reference signal for washing out steady state differences therebetween, and control means responsive to said first and second estimate signals for providing control signals to said control surface means in accordance with a combination thereof for stabilizing said aircraft about said axis.

2. The apparatus of claim 1 further including means responsive to the difference between one of said first and second estimate signals and said reference signal corresponding thereto for providing a signal in accordance with said difference for balancing error components in said angular acceleration signal.

3. The system of claim 1 further including means for establishing an initial angular rate value and an initial angular attitude value in said first and second integrator means respectively in accordance with the existing values of the corresponding reference signals from said reference sensor means.

4. The system of claim 1 further including monitoring means responsive to the difference between said first estimate signal and said angular rate reference signal for providing a failure signal when said difference signal exceeds a predetermined threshold.

5. The system of claim 1 in which said axis comprises the pitch axis of said aircraft.

6. The system of claim 5 in which said first and second linear accelerometer means comprises
a first linear accelerometer mounted in said aircraft for measuring the linear acceleration along the vertical axis thereof,
a second linear accelerometer mounted in said aircraft and spaced from said first accelerometer for measuring the linear acceleration along the vertical axis thereof, and
said combining means comprises summing means coupled to receive the outputs of said first and second accelerometers for providing the difference therebetween, thereby providing said signal in accordance with the angular acceleration of said aircraft about said pitch axis.

7. The system of claim 6 in which said first linear accelerometer is mounted in said aircraft forward of the center of gravity thereof and said second linear accelerometer is mounted in said aircraft aft of the center of gravity thereof.

8. The system of claim 5 in which said reference sensor means comprises
attitude sensor means for providing a signal in accordance with the pitch attitude of said aircraft, and
rate taker means responsive to said pitch attitude signal for providing a signal in accordance with the pitch rate of said aircraft.

9. The system of claim 8 in which said attitude sensor comprises an inertially referenced attitude sensor.

10. The system of claim 5 in which said control means comprises means for combining the output of one of said first and second accelerometers with said first and second estimate signals in accordance with a control law having terms in accordance with vertical acceleration, pitch acceleration, pitch rate and pitch attitude to provide said stabilizing control signals to said control surface means.

11. The system of claim 1 in which said first washout circuit means comprises
said first integrator means, and
summing means responsive to said first estimate signal and said angular rate reference signal for providing an input to said first integrator means in accordance with the difference therebetween,
the washout circuit formed thereby having a relatively long time constant with respect to the low frequency responses of said aircraft,
whereby in the event of failure of said angular rate reference signal, said first estimate signal gradually decays to a washed out short term angular rate signal.

12. The system of claim 11 further including monitoring means responsive to the output of said summing means for providing a failure signal when said difference signal exceeds a predetermined threshold.

13. The system of claim 12 in which said monitoring means comprises threshold circuit means responsive to said difference signal for providing said failure signal when said difference signal exceeds a predetermined threshold, and
threshold adjusting means coupled to said threshold circuit means for adjusting said threshold in accordance with the bank angle of said aircraft.

14. The system of claim 1 in which said second washout circuit means comprises
said second integrator means, and
summing means responsive to said second estimate signal and said angular displacement reference signal for providing an input to said second integrator means in accordance with the difference therebetween,
the washout circuit formed thereby having a relatively long time constant with respect to the low frequency responses of said aircraft,
whereby in the event of failure of said angular displacement reference signal, said second estimate signal gradually decays to a washed out short term angular displacement signal.

15. The system of claim 14 further including error balancing means responsive to the output of said summing means for providing a signal in accordance with said difference between said second estimate signal and said angular displacement reference signal for balancing error components in said angular acceleration signal.

16. The system of claim 15 in which said error balancing means comprises
third integrator means coupling the output of said summing means to an input of said first integrator means with opposite polarity with respect to said angular acceleration signal so that said output of said summing means goes to null thereby balancing said error components,
means for memorizing the output of said third integrator means, and
switching means for coupling said output of said summing means to said third integrator means and for coupling the output of said third integrator means to said input of said first integrator means in an initializing mode of said system and for disconnecting said third integrator means from said output of said summing means and for switching said input to said first integrator means from said output of said third integrator means to the output of said memorizing means in an operating mode of said system.

17. The system of claim 1 in which said aircraft comprises a relaxed static stability aircraft.

18. The system of claim 1 in which
said first washout circuit means comprises said first integrator means and summing means responsive to said first estimate signal and said angular rate reference signal for providing an input to said first integrator means in accordance with the difference therebetween,
said second washout circuit means comprises said second integrator means and summing means responsive to said second estimate signal and said angular displacement reference signal for providing an input to said second integrator means in accordance with the difference therebetween, and
said system further includes initializing means for establishing an initial angular rate value and an initial angular attitude value in said first and second integrator means respectively in accordance with the existing values of the corresponding reference signals from said reference sensor means.

19. The system of claim 18 in which said initializing means comprises means for changing the gain of said first and second washout circuit means from a relatively high gain in an initializing mode of said system to a relatively low gain in an operating mode of said system whereby in said initializing mode said first and second integrator means assume the existing values of said angular rate and angular displacement reference signals respectively and whereby in said operating mode said first and second washout circuit means have relatively long time constants with respect to the low frequency responses of said aircraft such that in the event of failure of said angular rate and angular displacement reference signals, said first and second estimate signals gradually decay to washed out short term angular rate and angular displacement signals respectively.

20. A stability augmentation system for relaxed longitudinal static stability aircraft having elevator means for controlling said aircraft about said pitch axis thereof comprising first and second linear accelerometers mounted in said aircraft spaced apart with respect to each other for measuring linear acceleration along the vertical axis thereof, first summing means coupled to receive the output signals from said first and second accelerometers for providing the difference therebetween, thereby providing a signal in accordance with the angular acceleration of said aircraft about said pitch axis, reference attitude sensor means for providing a first reference signal in accordance with inertially referenced pitch attitude of said aircraft, rate taker means responsive to said first reference signal for providing a second reference signal in accordance with inertially referenced pitch rate of said aircraft, first integrator means for integrating said angular acceleration signal to provide a first estimate signal in accordance with the pitch rate of said aircraft, second summing means responsive to said first estimate signal and said second reference signal for providing an input to said first integrator means in accordance with the difference therebetween, said first integrator means and said second summing means forming first washout circuit means for washing out steady state differences between said first estimate signal and said second reference signal, said second reference signal dominating in the steady state and having a relatively long time constant with respect to the low frequency responses of said aircraft, whereby in the event of failure of said second reference signal, said first estimate signal gradually decays to a washed out short term pitch rate signal, second integrator means for integrating said first estimate signal to provide a second estimate signal in accordance with the pitch attitude of said aircraft, third summing means responsive to said second estimate signal and said first reference signal for providing an input to said second integrator means in accordance with the difference therebetween, said second integrator means and said third summing means forming second washout circuit means for washing out steady state differences between said second estimate signal and said first reference signal, said first reference signal dominating in the steady state and having a relatively long time constant with respect to the low frequency responses of said aircraft, whereby in the event of failure of said first reference signal, said second estimate signal gradually decays to a washed out short term pitch attitude signal, and control law means for combining the output of one of said first and second accelerometers with said first and second estimate signals in accordance with a control law having terms in accordance with linear acceleration along the vertical axis of said aircraft, pitch acceleration, pitch rate and pitch attitude to provide control signals to said elevator means for stabilizing said aircraft about said pitch axis.

21. The apparatus of claim 20 in which said first and second linear accelerometers are mounted in said aircraft forward and aft, respectively, of the center of gravity thereof.

22. The system of claim 20 operable in an initialize mode and in an operate mode the outputs of said first and second accelerometers containing undesirable error components, said system further including error balancing means responsive to the output of said third summing means for providing a signal to said first integrator means in accordance with said difference between said second estimate signal and said first reference signal for balancing said error components in said angular acceleration signal.

23. The system of claim 22 in which said error balancing means comprises third integrator means, first switching means for coupling the output of said third summing means to the input of said third integrator means in said initialize mode and for disconnecting said output of said third summing means from said input to said third integrator means in said operate mode, means coupled to said third integrator means for memorizing the output thereof, a further input to said first integrator means of opposite polarity with respect to the input thereof from said first summing means, and second switching means coupling said further input of said first integrator means to the output of said third integrator means in said initialize mode and to the output of said memorizing means in said operate mode, whereby said output of said third summing means goes to null in said initializing mode thereby balancing said error components.

24. The system of claim 23 further including initializing means for changing the gain of said first and second washout circuit means for relatively high gain in said initialize mode to a relatively low gain in said operate mode whereby in said initialize mode said first and second integrator means assume the existing values of said second and first reference signals respectively and whereby in said operate mode said first and second washout circuit means have said relatively long time constants with respect to the low frequency responses of said aircraft such that in the event of failure of said reference attitude sensor means, said first and second estimate signals gradually decay to washed out short term pitch rate and pitch attitude signals respectively.

25. The system of claim 24 further including monitoring means comprising threshold circuit means responsive to the output of said second summing means for providing a failure signal when said difference between said first estimate signal and said second reference signal exceeds a predetermined threshold,
adjusting circuit means for providing an adjusting signal in accordance with the bank angle of said aircraft, and
combining means for combining said adjusting signal with the output signal from said second summing means for compensating said output signal for body axis pitch rate components not contained in said inertially referenced second reference signal.

* * * * *